US005560635A

United States Patent [19]

Roy

[11] Patent Number: 5,560,635
[45] Date of Patent: Oct. 1, 1996

[54] FOLDING WHEELCHAIR

[76] Inventor: Richard A. Roy, 6933 Temperance Point St., Westerville, Ohio 43082-8706

[21] Appl. No.: 507,379

[22] PCT Filed: Aug. 31, 1993

[86] PCT No.: PCT/US93/08164

§ 371 Date: Aug. 16, 1995

§ 102(e) Date: Aug. 16, 1995

[87] PCT Pub. No.: WO95/06581

PCT Pub. Date: Mar. 9, 1995

[51] Int. Cl.$^{6}$ ........ B62B 3/02
[52] U.S. Cl. ........ 280/642; 280/657
[58] Field of Search ........ 280/38, 638, 639, 280/641, 642, 643, 657, 658, 655

[56] References Cited

U.S. PATENT DOCUMENTS 4,542,917 9/1985 Waite ........ 280/650
4,813,693 3/1989 Lockard ........ 280/42
5,188,383 2/1993 Thompson ........ 280/250.1

*Primary Examiner*—Richard M. Camby
*Attorney, Agent, or Firm*—Dykema Gossett PLLC

[57] ABSTRACT

A folding wheelchair has a pair of spaced apart side frames (114) joined together by a seat (126) and a back (118) for supporting a person transported in the wheelchair. Each frame has a pivotally mounted, wheeled front leg (116) and a pivotally mounted back fork post that straddles a mar wheel (118). The rear wheel has a quick release mechanism. By virtue of the pivotal mounting (112) front legs of the wheelchair fold under the seat and the back folds over the seat. The rear wheels are released from the wheel chair for storage along with or apart from the wheelchair.

1 Claim, 2 Drawing Sheets

FOLDING WHEELCHAIR

This application is a 371 of PCT US93/08164 Aug. 31, 1993.

FIELD OF THE INVENTION

This invention relates generally to wheelchairs for disabled persons, and more particularly to a wheelchair that folds to occupy little space while being stored or transported in a vehicle. Still more particularly, the present invention relates to a wheelchair that may be folded and partially disassembled to allow for convenient options in storage and space for transporting in a vehicle.

BACKGROUND OF THE INVENTION

Folded wheelchairs for disabled persons are well known in the art. Generally, folding wheelchairs are folded along a vertical axis that brings together the wheels of the chairs. With a canvas seat and a canvas back, such chairs may be readily and quickly unfolded to be placed into service.

While such folded wheelchairs have the advantage of quick assembly, they suffer from the disadvantage of bulk. Folding such a chair overcomes the width of the chair as a dimension across a front elevation of the chair, but does not overcome the height of the chair in the same elevation or the depth of the chair. Thus, there is still considerable bulk with regard to the overall volume that the chair might occupy in a place of storage or in the trunk of a vehicle. Moreover, this bulk controls remaining storage space or luggage space, as conventional folded wheelchairs are not adapted for easy disassembly so that parts of the wheelchair may be stored in convenient recesses to maximize storage space for other articles.

OBJECTS OF THE INVENTION

With the above described difficulties accompanying most known folding wheelchairs in view, a primary object of the present invention is to provide a folding wheelchair that has an axis for folding which allows for a more advantageous profile for storing and transporting the folded wheelchair.

Another object of the present invention is to provide a folded wheelchair that has means for disassembling part of the wheelchair to take advantage of arranging storage of the wheelchair with storage of other articles in a limited storage space. These and other objects have been achieved by the present invention.

SUMMARY OF THE INVENTION

A folding wheelchair includes a pair of spaced apart side frames, each frame including a side rail, a front leg, and a post. The front leg of each frame is pivotally attached to the side rail so that the front leg may be rotated from an orientation at which the front leg extends generally parallel to the side rail, generally between front and back ends of the side rail, to an orientation at which the front leg is generally perpendicular to the side rail, and vice versa. Each spaced apart side frame also has a post that is pivotally attached to the side rail so that the post may be rotated from an orientation at which the post extends generally parallel to the side rail, generally between the ends of the side rail, to an orientation at which the post is generally perpendicular to the side rail. A pair of front wheels are attached to the front legs, and a pair of quick release rear wheels are releasably mounted on quick release mounts of the pair of posts. Cross members provide seat and back structure to support a person seated in the wheelchair and to join or interconnect the spaced apart side frames.

The chair may be folded as follows: Cushions, on which a person sits and rests his or her back while in the wheelchair, are removed. The rear wheel is removed from each of the fork posts. The posts are pivoted to collapse the back of wheelchair over the seat of the wheelchair.

The front legs are pivoted under the seat of the wheelchair as the final step in collapsing the wheel chair.

By reversing these steps, the wheelchair may be unfolded so that it may be uprighted and operable for use to transport a disabled person.

DETAIL DESCRIPTION OF THE PREFERRED EMBODIMENT

Figure 1:
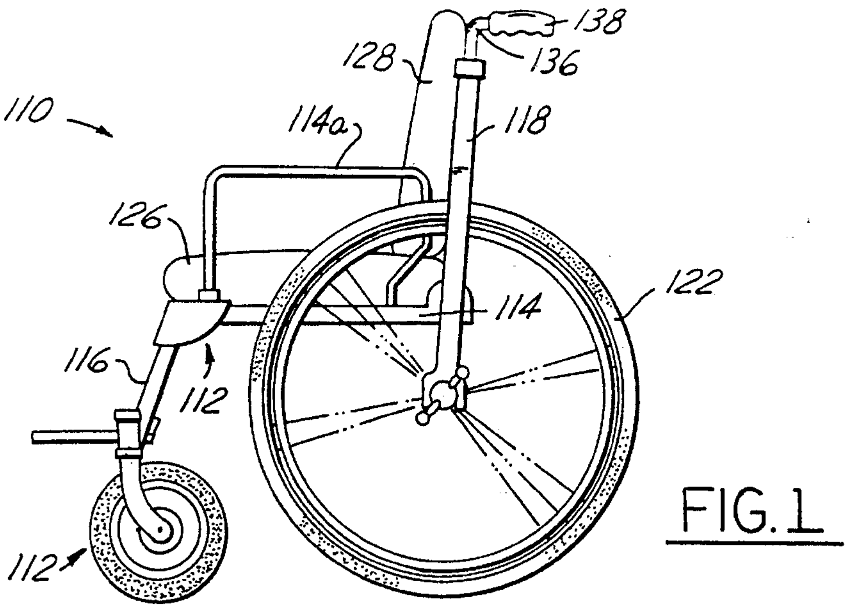
FIG. 1 is a side elevation showing the folded wheelchair according to the invention.
Figure 2:
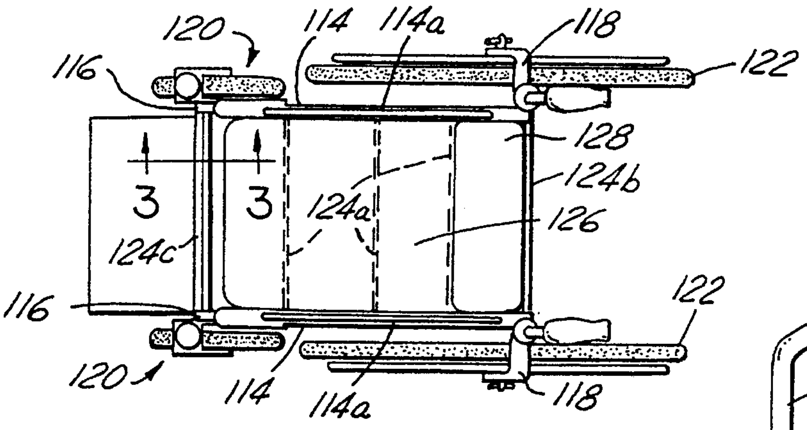
FIG. 2 is a top view of the folded wheelchair of this invention.

Referring to FIGS. 1 and 2, a foldable wheelchair includes a frame 112 preferably formed of a light weight tubular metal. The frame 112 may have two laterally spaced rails 114 supported, when the wheelchair is assembled and unfolded, by laterally spaced front legs 116 and laterally spaced rear fork posts 118. Front legs 116 have lower, free ends on which casters 120 are attached, although wheel arrangements other than casters may be used for front wheels. Fork posts 118 straddle and are attached to large wheels 122. Rails 114 are joined by cross members **124*a*, but may be joined by a solid platform to provide a support for a seat cushion 126. Thus, the cushion seat 126 is supported on a horizontal section of the frame 112. A back cushion 128 is supported on cross members 124*b* extending between fork posts 118. As with the seat structure, the vertical backing for the seat back may be a solid flat panel. Guard rails 114*a* are carried by side rails 114. Holes or wells (not shown) are provided in rails 114 to accept guard rails 114*a*. The guard rails 114*a* are accordingly supported by the side rails. Guard rails 114*a* may be easily placed into supporting relationship with rails 114 for complete assembly of wheelchair 110 and easily taken out of rails 114 for disassembling wheelchair 10**.

Figure 3:
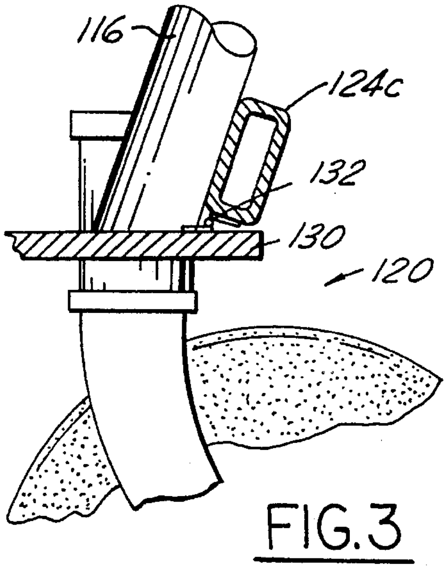
FIG. 3 is an enlarged partial sectional view taken along line 3—3 of FIG. 2.

Depending from a front cross member 124*c*, as can be seen particularly in FIG. 3, is a foot rest 130. Foot rest 130 is a plate that hingedly depends from cross member 124*c* and that spans between legs 116. Foot rest 130 may articulate about a hinge 132 until foot rest 130 comes into contact with cross member 124*c* to inhibit rotation of foot rest 130. Consequently, a foot resting on foot rest 130 will be supported as foot rest 130 ceases to rotate. Cross member 124*c* provides for some rigidity in the frame 112 of wheelchair 110, as it provides support for foot rest 130.

Figure 4:
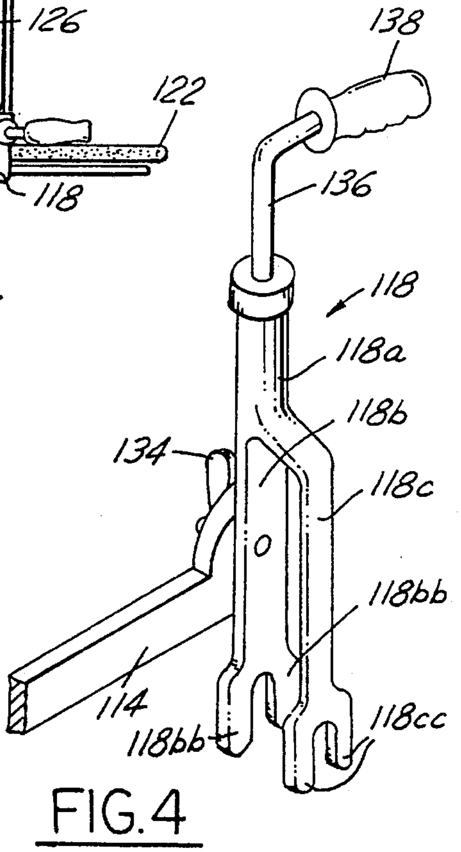
FIG. 4 is a partial perspective view of the wheel fork section in accordance with the present invention.

With reference to FIG. 4, it can be seen that each fork post 118 is pivotally connected to a side rail 114. A lever 134 is provided for locking fork post 118 in a generally perpendicular relationship with side rail 114. Each fork post 118 includes a head tube 118*a*. Extending from the head tube 118*a* is a steering arm 136, which may be a metal tubing bent to have a rearwardly extending portion on which a hand grip 138 is suitably mounted. Arm 136 extends downwardly into head tube 118*a* so that the overall length of post 118 and arm 136 may be adjusted.

Still with reference to FIG. 4, fork post 118 branches at one end of head tube 118*a* into inner fork blade 118*b* and outer fork blade 118*c*. Each fork blade 118*b* or 118*c* has a fork tip 118*bb* or 118*cc* for receiving a quick release type bicycle coupling at the axle of wheel 122. Quick release couplings, which are known to those of ordinary skill in the bicycle art, allows wheel 122 to be released from the fork tips 118*bb* and 118*cc*.

Thus, with reference to all of the Figures, the structure of the folding wheelchair 110 is that of a pair of spaced apart side frames with each frame including a side rail 114, a front leg 116, and a post 118. The leg 116 of each post is pivotally attached to the side rail 114 so that the front leg 116 may be rotated from an orientation shown in FIGS. 8 and 9, at which the front leg extends generally parallel to the side rail 114 generally between front and back ends of the side rail 114, to an orientation shown in FIGS. 1, 5–7 and 10, at which the front leg 116 is generally perpendicular to the side rail 114, and vice versa. Each spaced apart side frame also has a post 118 that is pivotally attached to the side rail 114, so that the post 118 may be rotated from an orientation shown in FIGS. 7 and 8, at which the post leg extends generally parallel to the side rail, generally between the ends of the side rail 114, to an orientation shown in FIGS. 1 and 4–6 at which the post 118 is generally perpendicular to the side rail 114. A pair of front wheels 120 are attached to the front legs 116 of each frame, and a pair of quick release rear wheels 122 are releasably mounted on quick release mounts, which, in the preferred embodiment, are the fork tips 118*bb* and 118*cc*. Cross members 124*b* and 124*c* provide seat and back structural means to join or interconnect the spaced apart side frames.

Figure 5:
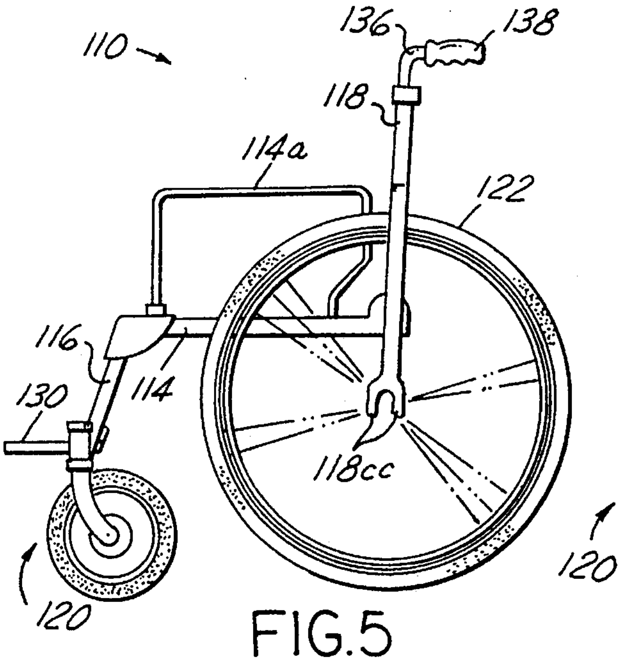
FIG. 5 is a diagramatic side elevation showing the present invention assembled and in an operative posture, but with seat cushions removed.

In FIGS. 5–8 indicate the steps of folding the wheelchair 110. With reference to FIG. 5, the cushions 126 and 128 are removed from the wheelchair 110. The elements, described with reference to FIG. 1, are shown in FIG. 5 as the frame 112, including the side rails 114 that are supported by legs 116 with wheels 120 and fork posts 118 with wheels 122. An arm 136 is shown extending from a head tube 118*a* of a fork post 118.

Figure 6:
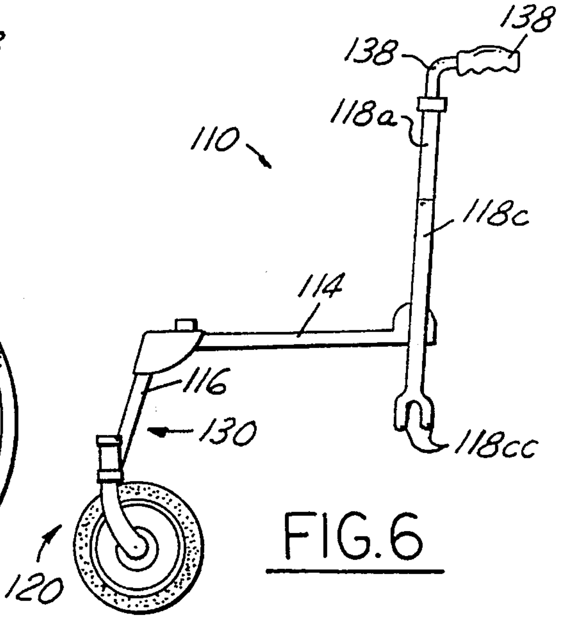
FIG. 6 is a side elevation showing the wheelchair with the large wheels removed and the side bars removed.

Referring to FIG. 6, wheels 122 are removed from fork posts 118. As said above, wheels 122 are releasable type of wheels, known in the art of making bicycles, particularly racing bicycles.

Figure 7:
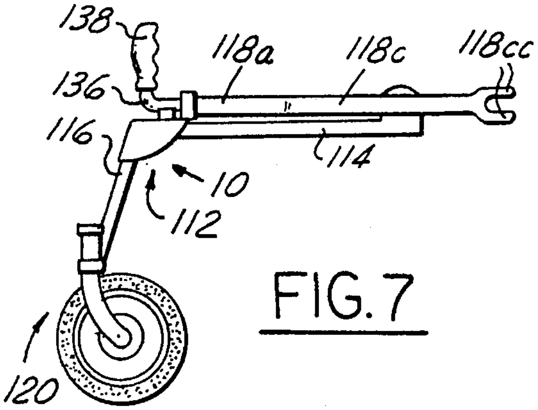
FIG. 7 is a side elevation view of the wheelchair with the large wheels and side bars removed and the back section folded against the seat section.

Then, referring to FIG. 7, posts 118 are pivoted to collapse the back of wheelchair 110 over the seat of the wheelchair.

Figure 8:
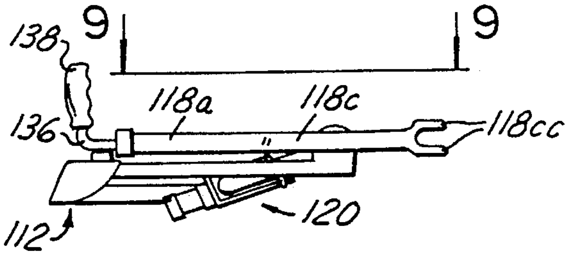
FIG. 8 is a side view of the wheelchair completely folded with the wheels and side bars removed.
Figure 9:
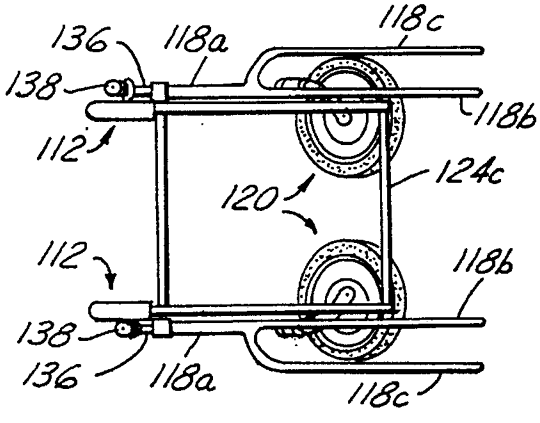
FIG. 9 is a plan view of the wheelchair completely folded, as viewed in the direction of arrows 9—9 of FIG. 8.
Figure 10:
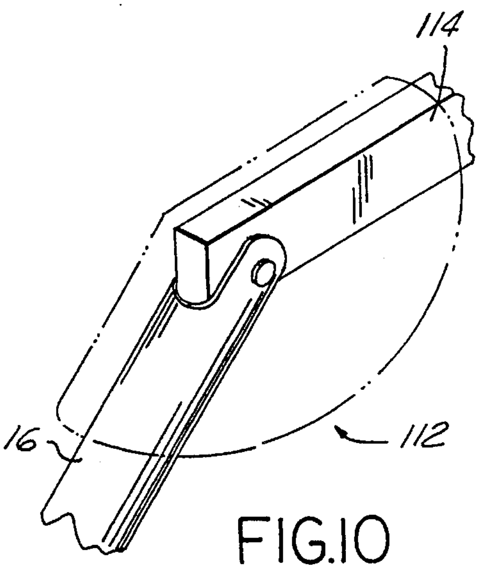
FIG. 10 is a partial perspective view of a detail referenced by the numeral 10 of FIG. 7.

Referring to FIGS. 8 and 9, legs 116 are pivoted under the seat of the wheelchair as the final step in collapsing the wheel chair. Referring to FIG. 10, the legs 116 are pivotable with respect to the rails 114. A flexible cover is preferred over each pivotable joinder of a leg 116 and side rail 114, so that clothing or flesh is not pinched between a leg 116 and side rail 114.

By reversing these steps, the wheelchair may be unfolded to be uprighted and operable for use to transport a disabled person.

Although the present invention has been described with reference to a preferred embodiment thereof, it will be apparent to those skilled in the art that various alternatives and modifications can be carried out without departing from the scope of the present invention.

I claim:

1. A folding wheelchair comprising:

a pair of spaced apart side frames, each said side frame including a side rail having front and back side rail ends, the side rail extending between the front and back ends, a front leg having a free end and an opposite end pivotally attached to the side rail so that the front leg may be rotated from an orientation at which the front leg extends generally parallel to the side rail, generally between the side rail front and back ends, to an orientation at which the front leg is generally perpendicular to the side rail, and a post that is pivotally attached to the side rail rear end so that the post may be rotated from an orientation at which the post extends generally parallel to the side rail, generally between the side rail back and front ends, to an orientation at which the post is generally perpendicular to the side rail, the post having a quick release wheel mounting means;

a pair of front wheel means, each said front wheel means attached to the free end of the front leg;

a pair of quick release rear wheels, each said quick release rear wheel releasably mounted on the quick release mounting means;

seat structure means connecting the side frames, said seat structure means for supporting a person thereon; and back structure means extending between the posts of the pair of spaced apart side frames.

* * * * *